UNITED STATES PATENT OFFICE.

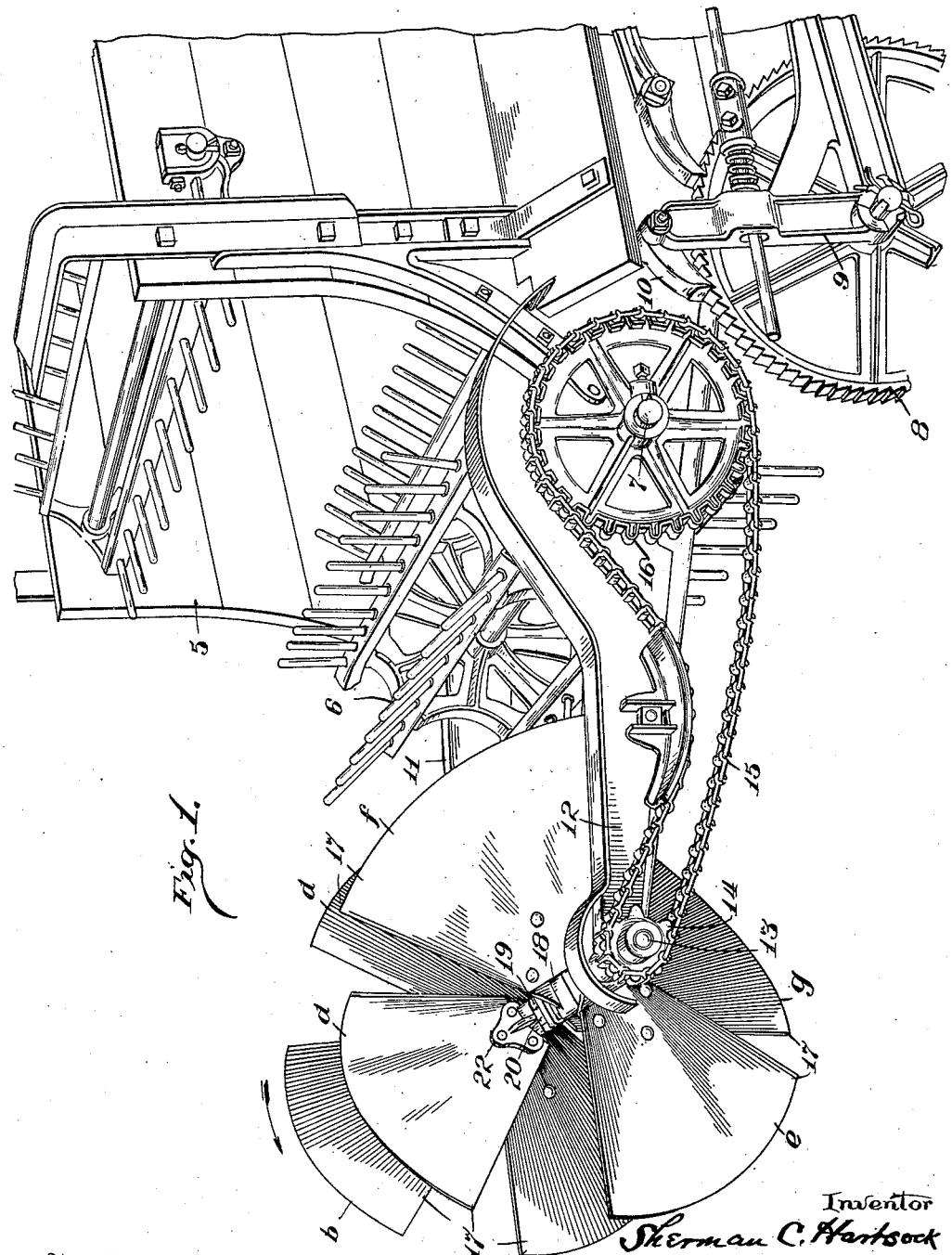

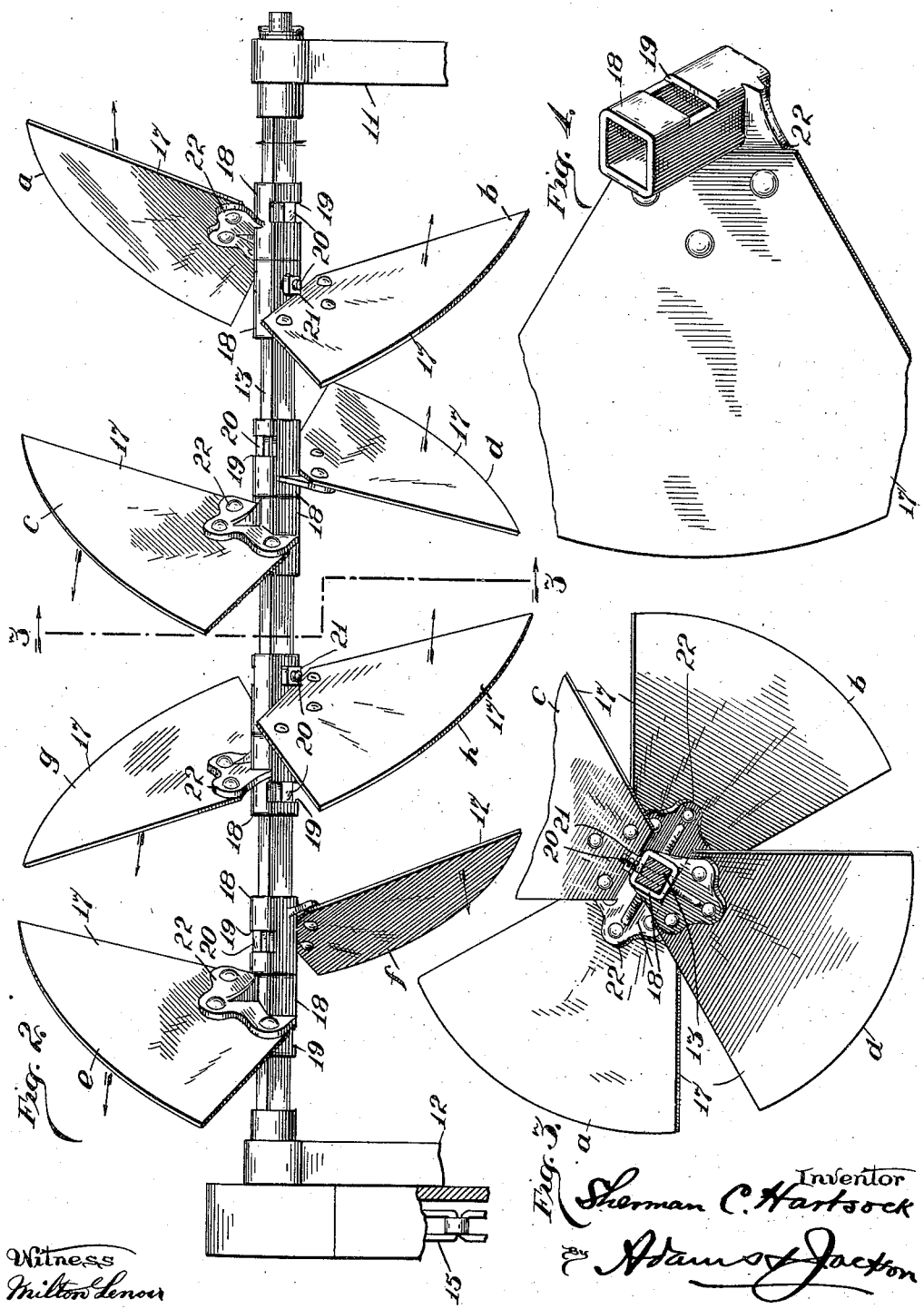

SHERMAN C. HARTSOCK, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

FERTILIZER-DISTRIBUTER.

1,313,595.  Specification of Letters Patent.  Patented Aug. 19, 1919.

Application filed April 2, 1919. Serial No. 286,928.

*To all whom it may concern:*

Be it known that I, SHERMAN C. HARTSOCK, a citizen of the United States, and a resident of Moline, in the county of Rock Island and State of Illinois, have invented certain new and useful Improvements in Fertilizer-Distributers, of which the following is a specification, reference being had to the accompanying drawings.

This invention relates to that type of fertilizer distributers wherein the manure or other material to be distributed over a field is moved by means of an intermittently-driven endless carrier toward the open rear end of a wagon-body and there acted upon by a constantly-rotating scattering device termed a beater. It is desirable to effect such a scattering of the material that it will be distributed not only in the rear of the vehicle but to a considerable distance at each side so that the ground covered with the fertilizer will be a strip of greater width than the width of the vehicle. To this end various constructions have been devised for effecting such a distribution of the material, the same frequently comprising a plurality of blades or arms diagonally arranged with respect to a rotatable shaft upon which they were secured, a portion of such blades or arms being so shaped or inclined as to force the material thrown against them from the beater to one side of the track of the vehicle while the remainder forced another portion of the material in the opposite direction. While such devices have been successful in thus distributing the fertilizing material over a comparatively wide area they have been found objectionable because of leaving a strip of ground in rear of the center of the width of the vehicle uncovered or, at best, not as heavily or evenly covered with the material as the portions of ground at the sides of such strip.

It is the object of my invention to provide a construction of rotating distributer that will insure an even and proper depositing of the material so that no thinly covered or partially covered strip of ground can be left in rear of the center of the vehicle, and I accomplish this object by the construction and arrangement of the distributer blades or arms on their rotatable shaft, all as hereinafter specifically described. That which I believe to be new and desire to cover by this application will be set forth in the claims.

In the drawings,—

Figure 1 is a perspective view of the rear end portion of an ordinary fertilizer-distributer with a wide-spread attachment embodying my improvements connected therewith;

Fig. 2 is a front view of my improved wide-spread distributing device, a portion of the supporting means for the shaft thereof being also shown;

Fig. 3 is a cross-section through the shaft of the spreader, the section being taken at line 3—3 of Fig. 2,—one of the blades or arms being partly broken away; and Fig. 4 is an enlarged detail showing one of the blades or arms and the device by which it is secured upon the shaft.

Referring to the several figures of the drawings,—5 indicates the rear end of a vehicle body at the open rear end of which is mounted an ordinary beater 6 secured to a shaft 7 that is driven in the usual manner by means located at the opposite side of the wagon-body from that shown, and which means it is not necessary to here describe. It will be understood that the bottom of the vehicle body 5 comprises an endless carrier (not shown) by which the manure or other fertilizer material in the body 5 will be intermittently moved toward the beater so as to be acted upon and thrown to the rear by such beater. The means for intermittently moving such endless carrier comprises the usual ratchet 8 and a bell-crank lever 9 journaled upon the shaft of the ratchet and rocked by a cam or tappets acting upon the forwardly directed arm of the lever 9 and thereby, through a pawl 10 pivotally secured to the lever 9, turning such ratchet. These operating devices are well understood in the art and as they form no part of the present invention further description or illustration of them is not believed necessary. 11—12 indicate two arms extending rearwardly from opposite sides of the vehicle body and having journaled in their rear ends a shaft 13 upon one end of which is secured a small sprocket 14 around which passes an endless drive chain 15 that also passes around a sprocket gear 16 secured to a projecting end of the beater shaft 7.

The shaft 13 has non-rotatably secured to it a plurality of blades or arms and for more effectually preventing any independent movement of the blades or arms I prefer to make the shaft 13 angular in cross-section and fitting thereupon correspondingly-shaped hub members to each of which is bolted one of said blades or arms. The blades or arms referred to are each formed, in the construction shown, of a flat piece of heavy sheet metal 17 and each is mounted upon the shaft 13 by means of a hub member 18 having an opening therethrough of the same cross-sectional area as the angular shaft, which, of course, prevents any independent motion of the blades, and each hub is slotted as at 19 in which fits the head of a bolt 20 that passes through the shaft and has screwed upon it a retaining nut 21. Formed with each hub member 18 is a broad ear 22 that stands at a considerable angle to the axis of the shaft 13 and to each of said ears is riveted one of the blades 17. The blades are arranged in pairs, as clearly shown in Fig. 2, the several pairs being spaced equally from each other and the blades of each pair extending from opposite sides of the shaft—each pair of blades being so located that they extend out from the shaft along a line ninety degrees removed from the line of attachment of the next adjacent pair of blades. In other words, with a shaft square in cross-section such as shown the hub members of each pair would be so arranged thereon as to cause the two blades carried thereby to project from two opposite faces of said shaft while the next pair will have their hub members so arranged as to cause their blades to project from the other two faces of the shaft, and so on.

In addition to each of the blades being designated by the numeral 17 I have indicated the four that are shown at the right-hand side of Fig. 2 with the numerals, $a$, $b$, $c$ and $d$, and those at the left-hand side with the letters $e$, $f$, $g$ and $h$. Now referring to those at the right hand side it will be noted that the pair of blades $a$—$b$ and the blade $d$ of the pair $c$—$d$ are so arranged on the shaft that when fertilizer material is forced against them their inclination is such as to cause such material to be largely scattered to the right-hand side as viewed in said Fig. 2, whereas the inclination of the blade $c$ of the pair $c$—$d$ is such as to force and scatter the material in just the opposite direction. With respect to those blades at the left-hand side as seen in Fig. 2 the blades forming the pair $e$—$f$ and also the blade $g$ of the pair $g$—$h$ are so inclined as to force and scatter the material to the left as seen in that figure, whereas the blade $h$ will act upon the material to force and scatter it in just the opposite direction. From this it will be seen that one blade of each intermediate pair will tend to throw material in a lateral direction opposite to the direction that its companion blade tends to throw and opposite to the direction of throw of the other pair of blades on the same half of the shaft. This cross-throwing of material by one of each of the two intermediate pairs results in a substantially uniform distribution of the material on the ground and thus overcomes the objection to former constructions due to leaving a strip of ground centrally of the vehicle track with but a comparatively slight amount of such material. It will be noted by reference to Fig. 2 that arranging the pairs of blades $c$, $d$ and $g$, $h$ as described results in the blades of each of said pairs occupying substantially parallel planes and that the planes occupied by one of said pairs are at an angle to the planes occupied by the other of said pairs.

What I claim as my invention and desire to secure by Letters Patent, is—

1. A device for spreading material delivered from a fertilizer-distributer, said device comprising a rotatable shaft having a plurality of blades secured thereon, all of the blades except one on one half of the shaft being inclined to cause the material to be thrown toward the right and all of the blades except one on the other half of the shaft being inclined to cause the material to be thrown toward the left, each of said above-excepted blades being inclined in an opposite direction to those blades on the same half of the shaft.

2. A device for spreading material delivered from a fertilizer-distributer, said device comprising a rotatable shaft having a plurality of blades secured thereon, all of the blades except one on one half of the shaft being inclined to cause the material to be thrown toward the right and all of the blades except one on the other half of the shaft being inclined to cause the material to be thrown toward the left, each of said above-excepted blades being inclined in an opposite direction to those blades on the same half of the shaft, said last-named blades being located respectively adjacent to the midpoint of the length of the shaft.

3. A device for spreading material delivered from a fertilizer-distributer, said device comprising a rotatable shaft having a plurality of blades secured thereon, all of the blades except one on one half of the shaft being inclined to cause the material to be thrown toward the right and all of the blades except one on the other half of the shaft being inclined to cause the material to be thrown toward the left, each of said above-excepted blades being inclined in an opposite direction to those blades on the same half of the shaft, said last-named blades being located respectively adjacent to the midpoint of the length of the shaft and extending from different sides of the shaft.

4. A device for spreading material delivered from a fertilizer-distributer, said device comprising a rotatable shaft having a plurality of inclined blades secured thereon in pairs, the several pairs being spaced apart at substantially uniform distances, and one blade of each of the pairs at opposite sides of the midpoint of the length of the shaft being inclined in an opposite direction from the other blades on the same side of such midpoint.

5. A device for spreading material delivered from a fertilizer-distributer, said device comprising a rotatable shaft having a plurality of inclined blades secured thereon so as to project therefrom in staggered relation, one blade at each side of the midpoint of the length of the shaft being reversely inclined from the other blades at the same side of such midpoint.

6. A device for spreading material from a fertilizer-distributer, said device comprising a rotatable shaft having a plurality of inclined blades secured thereon in pairs, the inclination of one pair at one side of and adjacent to the midpoint of the length of the shaft being such that they lie in substantially parallel planes and the corresponding pair of blades at the opposite side of said midpoint also lying in substantially parallel planes, the said planes of one of said last-named pairs of blades being at an angle to the planes of the other of said last-named pair.

SHERMAN C. HARTSOCK.